(No Model.)
C. R. MARVIN.
Saw.
No. 242,951.    Patented June 14, 1881.
Fig. 1.
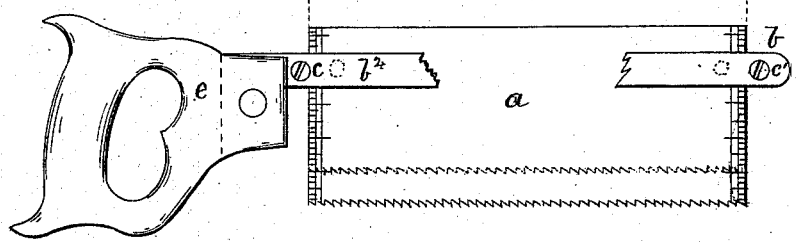
Fig. 2.
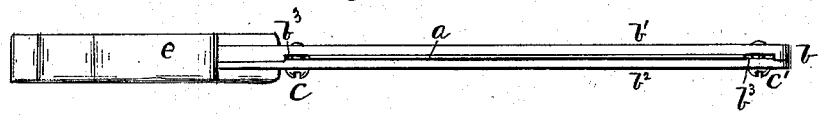
Fig. 3.    Fig. 4.
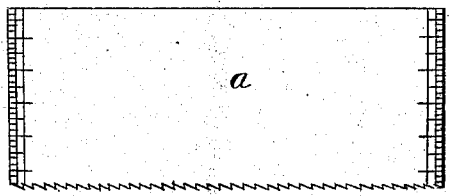 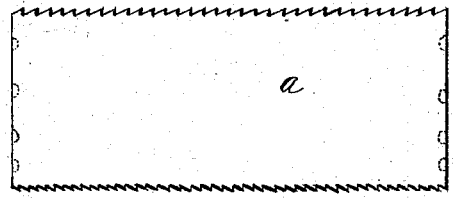
Fig. 5.
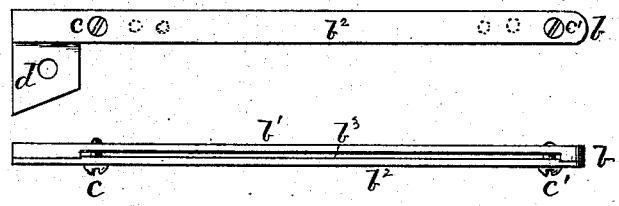
Witnesses:
M. M. Lacey
A. Parker
Inventor:
Curtis R. Marvin
By R.S. & A.P. Lacey,
Attys.

UNITED STATES PATENT OFFICE.

CURTIS R. MARVIN, OF STAMFORD, CONNECTICUT.

SAW.

SPECIFICATION forming part of Letters Patent No. 242,951, dated June 14, 1881.

Application filed February 7, 1881. (No model.)

*To all whom it may concern:*

Be it known that I, CURTIS R. MARVIN, a citizen of the United States, residing at Stamford, in the county of Fairfield and State of Connecticut, have invented certain new and useful Improvements in Saws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a saw in which the blade will be adjustable within its frame, and in which the frame will serve as a gage to regulate the depth of cut.

It consists in a slotted frame and a loose adjustable blade placed within the frame and held by set-screws or other suitable retaining means, as will be hereinafter fully explained.

In the drawings, Figure 1 is a side elevation of the saw blade and frame. Fig. 2 is a plan of the same. Figs. 3 and 4 show the blade separated from the frame, and Fig. 5 shows the frame.

$a$ is the blade, made in the form of the blade of the ordinary tenon-saw.

$b$ is the frame, which is made, by preference, of two bars, $b'$ $b^2$, constructed and fitted snugly together, so as to provide a vertical slot, $b^3$, between them. The slot extends nearly the entire length of the frame, and is just wide enough to permit the easy insertion into it of the saw-blade.

$c$ $c'$ are two set or clamp screws, which are put through the ends of the frame $b$ and through the ends of the slot, as shown, and they are arranged at a suitable distance apart, so that the ends of the blade $a$, when inserted in the slot $b^3$, will be close to them. The inner end of the frame is provided with lugs or other suitable device, $d$, to which the handle $e$ can be attached. The frame $b$ could be provided with additional holes for the set-screws $c$ $c'$, so that a shorter blade than the one shown could be employed, if desired. The frame is shown composed of two bars, $b'$ $b^2$, snugly fitted together; but it could be made in one piece, and the slot $b^3$ be formed by any suitable process.

The ends of the blade $a$ can be provided with graduated scales, as shown in Fig. 3, so that it can be set quickly and truly to cut any desired depth.

In this device the blade can be employed having teeth of different sizes on its opposite edge, as shown in Fig. 4, so that the mechanic can have at hand two saws of different degrees of fineness. The screws $c$ $c'$ can be loosened and the edges of the blade reversed in a very brief space of time.

The slot $b^3$ is shown closed at its outer end, and I prefer to have it so; but it will be readily understood that the outer end need not be closed, for the screw $c'$ serves to hold the outer ends of the bars $b'$ $b^2$ firmly in place.

It will be seen, further, that the frame $b$ will serve as a gage by which the depth of the cut of the blade is regulated, thus obviating the necessity of a separate device to be fixed on the blade for this purpose.

If desired, the blade could have a series of small notches (shown in Fig. 4 in dotted lines) to fit over the set-screw $c$; but I do not find such notches or other similar construction necessary. The blade is clamped tight enough by the frame and screws for all practical purposes.

Having thus described my invention, what I claim, and desire to secure by Letters Patent, is—

The improved saw-frame, consisting in the combination of the frame or bar $b$, constructed with the vertical longitudinal slot $b^3$, open above and below, the set-screws $c$ $c'$, the lug $d$, secured to the inner end of the frame or bar $b$, and the handle $e$, all arranged to operate substantially as set forth.

In testimony whereof I affix my signature, in presence of two witnesses, on this 2d day of February, 1881.

CURTIS R. MARVIN.

Witnesses:
HENRY MARVIN,
GEO. T. RUOFF.